US005608215A

United States Patent [19]
Evans

[11] Patent Number: 5,608,215
[45] Date of Patent: Mar. 4, 1997

[54] METHOD AND APPARATUS FOR DETERMINING DENSITY OF EARTH FORMATIONS

[75] Inventor: Michael L. Evans, Missouri City, Tex.

[73] Assignee: Schlumberger Technology Corporation, Sugar Land, Tex.

[21] Appl. No.: 599,712

[22] Filed: Feb. 12, 1996

Related U.S. Application Data

[63] Continuation-in-part of Ser. No. 307,894, Sep. 16, 1994, Pat. No. 5,539,225.

[51] Int. Cl.[6] .................................................. G01V 5/10
[52] U.S. Cl. ............................ 250/269.6; 250/269.2
[58] Field of Search ............................ 250/269.6, 269.2, 250/269.7, 390.06

[56] References Cited

U.S. PATENT DOCUMENTS

| | | | |
|---|---|---|---|
| 4,501,964 | 2/1985 | Arnold | 250/269.8 |
| 4,596,926 | 6/1986 | Coope . | |
| 4,661,700 | 4/1987 | Holenka . | |
| 4,698,501 | 10/1987 | Paske . | |
| 4,705,944 | 11/1987 | Coope . | |
| 4,760,252 | 7/1988 | Albats et al. . | |
| 4,814,609 | 3/1989 | Wraight et al. . | |
| 4,879,463 | 11/1989 | Wraight et al. . | |
| 4,883,956 | 11/1989 | Melcher et al. | 250/269.2 |
| 4,972,082 | 11/1990 | Loomis et al. . | |
| 5,051,581 | 9/1991 | Hertzog et al. . | |
| 5,091,644 | 2/1992 | Minette . | |
| 5,235,185 | 8/1993 | Albats et al. . | |
| 5,235,285 | 8/1993 | Clark et al. . | |
| 5,397,893 | 3/1995 | Minette . | |

OTHER PUBLICATIONS

*Well Logging for Earth Scientists* by Darwin V. Ellis, 1987 Elsevier Science Publishing Co., Inc., pp. 204–212, 418–425.

Richard Odom et al., "A New 1.625" Diameter Pulsed Neutron Capture and Inelastic/Capture Spectral Combination System Provides Answers in Complex Reservoirs", Paper O, Transactions of the SPWLA35th Annual Logging Symposium, Jun. 19–22, 1994.

R. D. Felder, "Advances in Openhole Well Logging," *Journal of Petroleum Technology* (Aug. 1994), pp. 693–701.

R. D. Wilson, "Bulk Density Logging With High Energy Gammas Produced by Fast Neutron Reactions With Formation Oxygen Atoms," Paper NSS11–01, presented at the 1995 IEEE Nuclear Science Symposium, Oct. 21–28, San Francisco. [proceedings not yet published].

*Primary Examiner*—Michael J. Tokar
*Assistant Examiner*—Richard Hanig
*Attorney, Agent, or Firm*—Martin Hyden; Wayne I. Kanak

[57] ABSTRACT

Apparatus for determining the density of underground formations surrounding a borehole, such as a wireline logging tool or a logging-while-drilling tool, includes a high energy neutron source for irradiating the formations from within the borehole and a detector which detects gamma rays in the borehole resulting from the irradiation of the formations with high energy neutrons. The detected gamma rays are analyzed to determine the density of the formations.

20 Claims, 6 Drawing Sheets

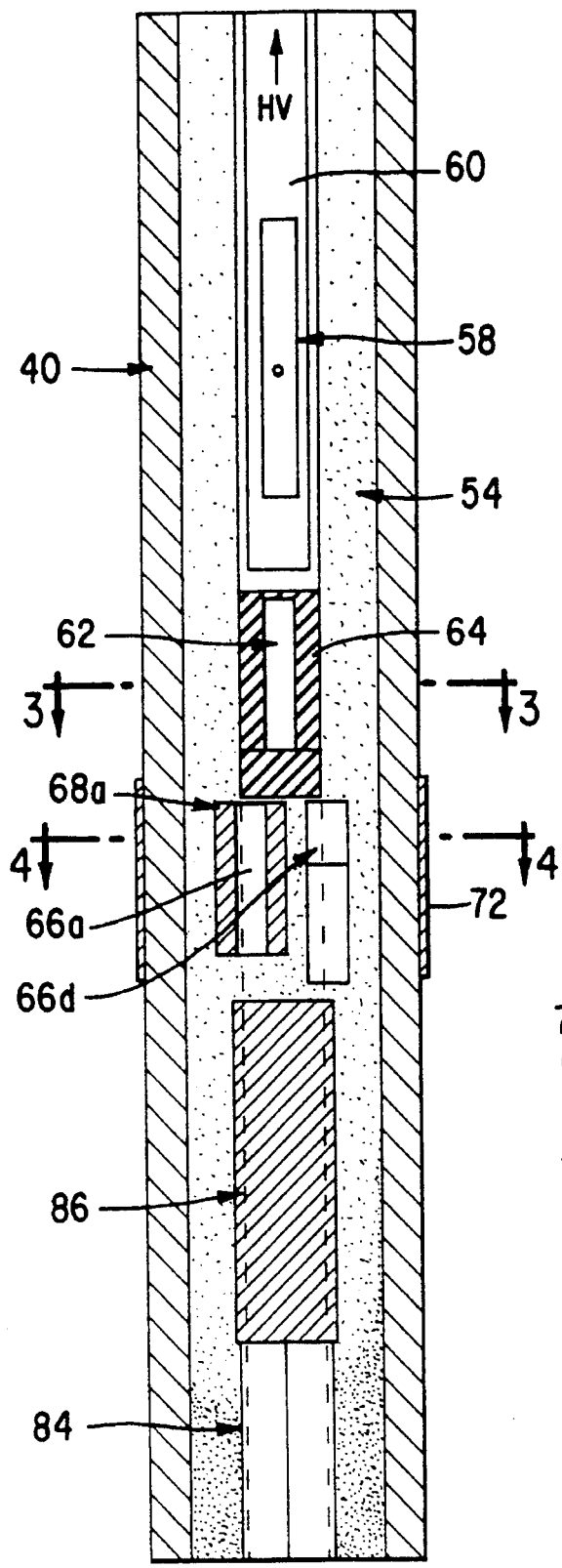
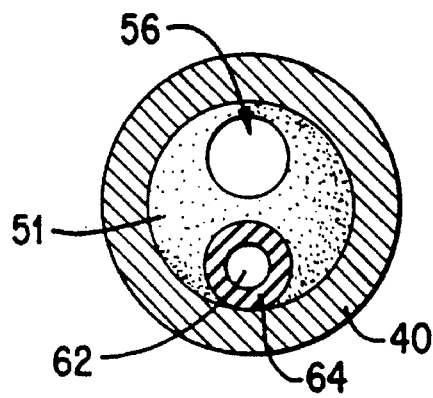
FIG. 3
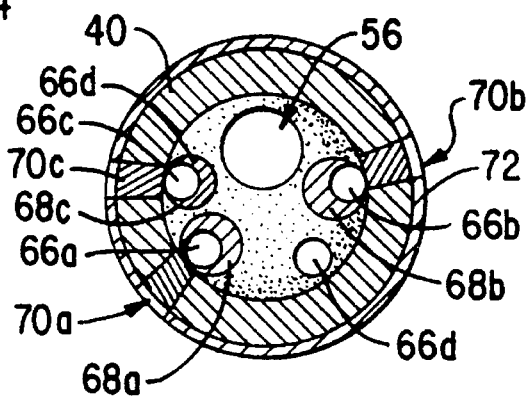
FIG. 4
FIG. 2

METHOD AND APPARATUS FOR DETERMINING DENSITY OF EARTH FORMATIONS

This application is a continuation-in-part of application Ser. No. 08/307,894, filed Sep. 16th, 1994, entitled "Accelerator-Based Methods and Apparatus for Measurement-While-Drilling" now U.S. Pat. No. 5,539,225.

FIELD OF THE INVENTION

The present invention relates generally to the investigation of subsurface earth formations and, more specifically, to methods and apparatus for making neutron-accelerator based density measurements. In their broadest aspects, certain of the techniques disclosed relate to wireline logging and measurement-while-drilling.

BACKGROUND OF THE INVENTION

The measurement of the porosities of subsurface earth formations surrounding a well borehole by means of the attenuation of neutron flux with distance from the neutron source is well known in wireline logging. Epithermal logging tools, in particular, are sensitive to the hydrogen density or concentration in a formation. As hydrogen is generally found in formation fluids, hydrogen concentration is related to the amount of pore space, and thus the porosity, of the formation. For a given porosity, however, an increase in matrix density (keeping the same matrix composition) can cause an epithermal neutron detector count rate (for a source-to-detector spacing of 60 cm for example) to decrease. This change in count rate is the same direction as would occur if the porosity increased for a given matrix density. Thus a neutron porosity measurement by itself cannot unambiguously determine the porosity of a formation of unknown composition.

It is conventional in wireline logging, therefore, to make bulk density measurements of a formation of interest by running a second tool, based on Compton scattering of gamma rays from electrons, over the same depth interval as the neutron porosity tool. An increase in matrix density also causes a decrease in the detector count rate in the density tool. On the other hand, if the porosity increases for a given matrix density, the density tool detector count rate increases. Changes in matrix density and porosity thus have complimentary effects on neutron porosity and Compton-scattering density tools, which effects can be offset by cross plotting the responses of the two tools. By use of such cross plots, the physics can be untangled and changes in matrix density and composition (lithology) can be determined. Because the inclusion of gas in the matrix pore spaces also affects the neutron porosity and density tool responses, it is possible in certain circumstances to detect the presence of gas by means of neutron/density cross plots.

The conventional bulk density measurement technique, however, requires a source of gamma rays, typically a $^{137}CS$ isotopic source. Such radioactive chemical sources have obvious disadvantages from a radiation safety viewpoint. This is of particular concern in measurement-while-drilling applications, where operating conditions make both the loss of a source more likely and its retrieval more difficult than in wireline operations. Indeed, the aforementioned measurement-while-drilling prior art patents have focused in substantial part on preventing the loss or, if lost, the recovery of such chemical sources.

Although accelerator-based wireline porosity tools are known, see, for example, U.S. Pat. No. 4,760,252 to Albats et al., there currently is no practical and economical accelerator-based alternative to the $^{137}Cs$ gamma ray source for density logging. A need exists, therefore, for an accelerator-based tool which would eliminate the requirement for the radioactive chemical sources of conventional bulk density tools.

SUMMARY OF THE INVENTION

The invention provides apparatus and methods which include a high-energy (preferably 14 MeV) neutron accelerator in a wireline tool or a drill collar section of a drill string, and at least one gamma ray detector spaced from the accelerator for measuring the radiation resulting from the neutron irradiation of the surrounding earth formations and indicative of the density thereof. In a preferred embodiment, a near-spaced neutron detector for monitoring neutron source flux, an intermediately-spaced epithermal neutron detector that is primarily responsive to formation hydrogen concentration and a far-spaced gamma ray detector that is responsive to formation density are provided in the tool. The near detector output is used to normalize the other detector outputs for source strength fluctuation. The normalized intermediately-spaced epithermal neutron detector output and the normalized far-spaced detector output are combined, in a manner conceptually similar to the conventional neutron porosity-density cross plot, to obtain measurements of formation porosity, bulk density and lithology and/or to detect gas. The measurements are made and recorded as a function of borehole depth and, where applicable, angular or azimuthal orientation in the borehole.

The near-spaced detector is preferably an epithermal neutron detector shielded by a neutron moderating-absorbing material to be substantially insensitive to formation-origin neutrons. Alternatively, it may comprise an MeV neutron detector, such as a $^4He$ detector or a liquid scintillator neutron detector, shielded by a high-Z material. The intermediately-spaced epithermal neutron detector may be one of a number of similarly spaced detectors forming a detector array. The array may include a plurality of like epithermal detectors spaced circumferentially about the inner wall of the drill collar to provide enhanced horizontal resolution. One or more gamma ray detectors and/or thermal neutron detectors may also be included in the array, if desired, the array detectors may be vertically spaced for improved vertical resolution. The far-spaced detector is preferably a gamma ray detector, but also may comprise a high-energy (>0.5 MeV) neutron detector, e.g., a $^4He$ or liquid scintillator detector. Alternatively, both a far-spaced gamma ray and a far-spaced neutron detector may be provided. Where a liquid scintillator is used, it could be configured to detect both neutrons and gamma rays.

In the measurement-while-drilling case, the neutron accelerator and the near-spaced detector are preferably coaxially aligned and eccentered to one side of the drill collar to accommodate the drilling fluid channel on the other side of the drill collar. To enhance sensitivity to the formation, the array detectors are preferably eccentered against the inner wall of the drill collar and back-shielded against borehole and drill collar transported neutrons. The far-spaced detector(s) is preferably coaxial with the accelerator and the nearspaced detector. It, too, is shielded against neutrons streaming along the borehole and the drill collar. A neutron transparent window is preferably provided opposite each neutron detector in the array to further enhance formation sensitivity and to increase the depth of investigation. A preferred construction of the neutron windows includes a low-scattering cross section material, such as titanium, sheathed in boron or other neutron-absorbing material to minimize neutron leakage into the drill collar. An external neutron absorbing layer, formed with openings at the locations of the neutron windows, may also be provided to further reduce neutron flow into the drill collar. As an alternative neutron window construction, transverse and/or longitudinal layers of neutron-absorbing material may be provided in the drill collar to attenuate longitudinal and/or circumferential neutron flow therein.

In addition to the aforementioned cross plot technique, the intermediately-spaced detector outputs and the far-spaced detector output may also be separately processed, if desired, to obtain other information of interest. For example, measurements of porosity and standoff may be derived from the slowing down time curve generated by the array epithermal neutron detector(s) and information as to the chemical composition of the formation may be obtained from a spectral analysis of gamma ray energy spectra recorded at the array gamma ray detector. Such a spectral analysis may alternatively be based on the output of the farspaced detector where that detector detects gamma rays. The thermal neutron detector output is useful in determining the formation macroscopic capture cross section and in measuring standoff. The thermal neutron macroscopic capture cross section, or its correlative the thermal neutron decay time constant, may also be determined from the gamma ray detector output. These additional measurements are useful alone or in interpreting the basic cross plot presentation.

The present invention uses gamma rays produced by interaction of neutrons with nuclei within the formation which act effectively as a "secondary" gamma ray source as opposed to a "primary" source in the tool such as a chemical source. Neutrons emerging from the accelerator penetrate the borehole fluid and formation rock surrounding the tool. These neutrons interact with the nuclei of the elements making up the tool, borehole fluid, and formation and produce gamma rays that travel back to a detector within the tool. The gamma rays can be produced by either inelastic scattering or thermal capture. Gamma rays from either type of interaction can be used as a secondary source of gamma rays for a density measurement. However, the location (depth) of the secondary source within the formation must remain effectively constant as formation properties change, otherwise a change in the number of detected gamma rays might be due to variations in secondary source position rather than changes in formation density. The depth of penetration of thermal neutrons into the formation depends on the magnitude of the thermal cross section of the formation. This can vary dramatically depending on the concentrations of highly absorptive nuclei such as boron and chlorine in the formation or borehole fluid. As a result, the location of the thermal capture secondary gamma-ray source depends strongly on the thermal cross sections of the borehole fluid and formation. On the other hand, gamma rays produced via inelastic interactions of fast neutrons are created in the same region ("hot spot") even as the formation properties change. This effect is due to two factors. First, the fast neutron cross sections of most elements differ by only about a factor of two, making the total cross section of the formation/borehole relatively insensitive to composition changes. Second, since the major elemental constituent of most sedimentary rock types oxygen and the concentration of oxygen varies little among different types of rocks, the fast neutron cross section for most sedimentary rocks is almost constant. This ensures that the location of the secondary inelastic gamma-ray source will be effectively stationary.

The intensity of the secondary gamma-ray source depends on two factors (excluding solid angle effects)—neutron attenuation and oxygen atom concentration. Neutrons emitted from the source interact with the nuclei of the tool, borehole, and formation. The fast neutrons are attenuated by both absorption and downscattering to lower energies. Since most inelastic cross sections have high thresholds (i.e. several MeV), reducing the neutron's energy is equivalent to absorption in terms of diminished gamma-ray production. Thus, the strength of the secondary gamma-ray source depends quite strongly (exponentially) on the number of high energy neutrons available to produce inelastic gamma rays. As a result, it is desirable for a density measurement utilizing this approach to include an accurate correction for neutron attenuation effects on the intensity of the secondary gamma-ray source. In addition, the secondary source intensity is proportional to the atom concentration of the material used as the secondary gamma-ray source. Since the formation is the source of gamma rays, it is clear that oxygen inelastic gamma rays are the preferred source for the measurement of formation density. This is true for at least two reasons. First, since oxygen is the most prolific constituent of sedimentary rocks and its concentration varies only slightly from rock to rock, its use entails only small corrections to the density measurement. Second, oxygen emits several high energy inelastic gamma rays that are easily resolved from interfering gamma rays by means of simple energy discrimination and does not require the more complicated forms of spectral deconvolution.

The neutron attenuation effects can be corrected by using a signal that reflects the behavior of the fast neutron flux responsible for creating the inelastic gamma-ray secondary source. This can be accomplished by using a separate fast neutron detector within the tool to provide an independent monitor of the fast neutron attenuation. More simply, fast neutron attenuation can be inferred by making use of the fact that neutrons interacting with the various components of the tool result in the production of both inelastic and epithermal capture gamma rays. For example, fast neutrons interacting with the iron of the tool yield inelastic gamma rays, the intensity of which varies in a manner very similar to that of the neutrons exciting inelastic gamma-ray production in oxygen—the secondary gamma-ray source. The gamma rays from iron are quite prominent in the inelastic gamma-ray spectrum and as a result, are easy to use without complicated spectral deconvolution techniques. Alternately, epithermal neutrons interacting with a crystal detector in the tool are known to result in a signal that behaves in a manner very similar to a thermal neutron porosity measurement. Since this crystal background typically comprises from 50% to 90% of the total inelastic gamma-ray spectrum, it is not difficult to derive a corrected signal that reflects the behavior of the fast neuron flux. This can also be used as a neutron attenuation correction signal for this density measurement.

BRIEF DESCRIPTION OF THE DRAWINGS

The present invention will now be described with reference to the accompanying drawings, in which:

FIG. 2 is a vertical cross-sectional view, partly in schematic form, of one embodiment of the downhole measurement subassembly including the neutron accelerator and associated radiation detectors;

FIG. 3 is a horizontal cross-sectional view taken along the line 3—3 in FIG. 2, showing the preferred location of the near-spaced detector relative to the drill collar;

FIG. 4 is a horizontal cross-sectional view taken along the line 4—4 in FIG. 2, showing one configuration of the array detectors and the associated neutron windows relative to the drill collar;

DESCRIPTION OF THE PREFERRED EMBODIMENT

The present invention has particular utility in both wireline and measurement-while-drilling applications. FIGS. 1–8 show a measurement-while-drilling embodiment of the invention.

Figure 1:
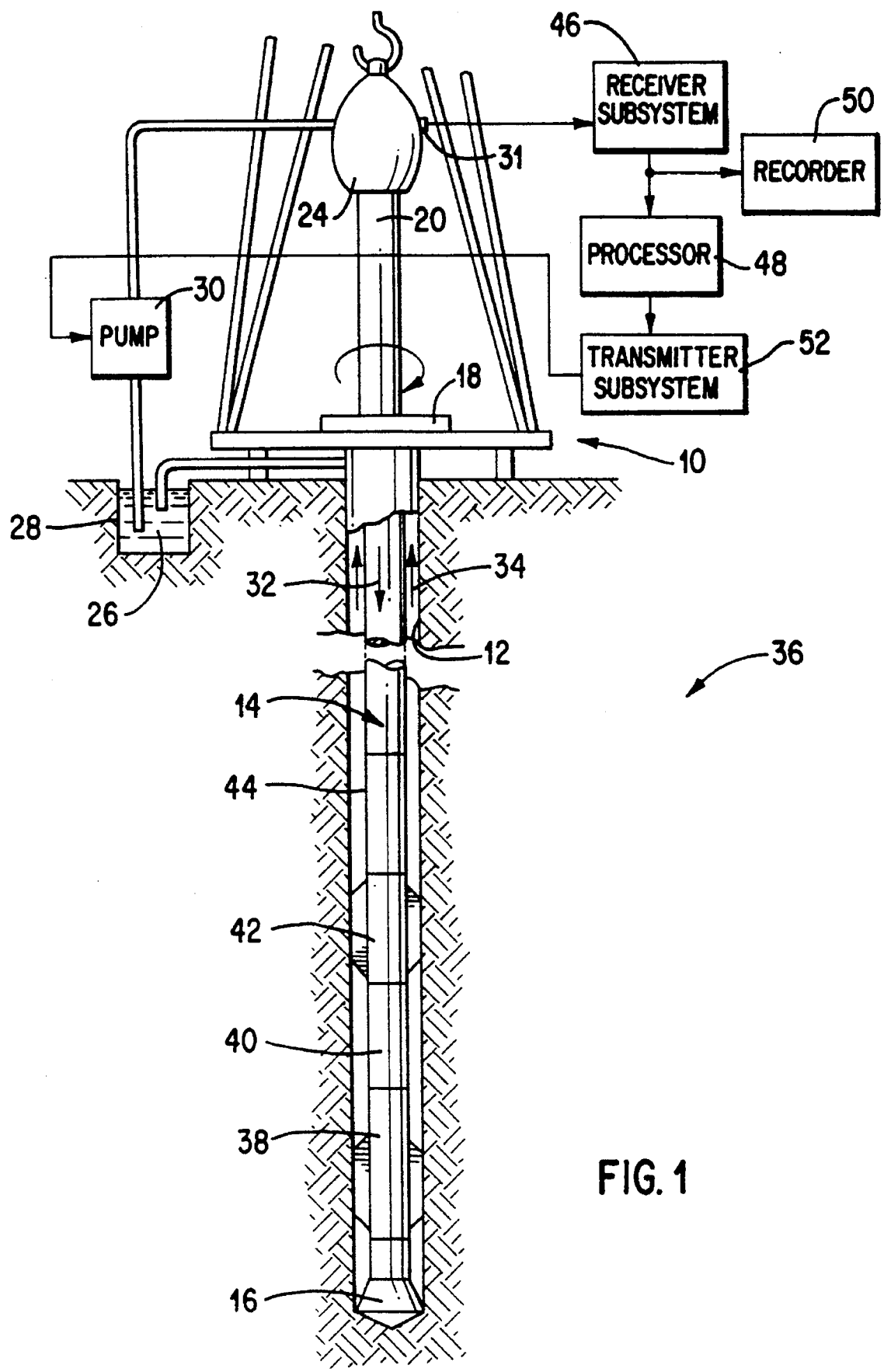
FIG. 1 is a schematic diagram, partly in block form, of one embodiment of a measurement-while-drilling apparatus constructed in accordance with the invention and including a drill string suspended from a rotary drilling platform.

As shown in FIG. 1, a platform and derrick 10 are positioned over a borehole 12. A drill string 14 is suspended within the borehole and includes a drill bit 16 at its lower end. The drill string 14 and the drill bit 16 attached thereto are rotated by a rotating table 18 (energized by means not shown) which engages a kelly 20 at the upper end of the drill string. The drill string is suspended from a hook 22 attached to a traveling block (not shown). The kelly is connected to the hook through a rotary swivel 24 which permits rotation of the drill string relative to the hook. Alternatively, the drill string 14 and drill bit 16 may be rotated from the surface by a "top drive" type of drilling rig. Drilling fluid or mud 26 is contained in a mud pit 28 adjacent to the derrick 10. A pump 30 pumps the drilling fluid into the drill string via a port in the swivel 24 to flow downward (as indicated by the flow arrow 32) through the center of drill string 14. The drilling fluid exits the drill string via ports in the drill bit 16 and then circulates upward in the annulus between the outside of the drill string and the periphery of the borehole, as indicated by the flow arrows 34. The drilling fluid thereby lubricates the bit and carries formation cuttings to the surface of the earth. At the surface, the drilling fluid is returned to the mud pit 28 for recirculation.

Mounted within the drill string 14, preferably near the drill bit 16, is a bottom hole assembly (indicated generally by the reference numeral 36), which includes subassemblies for making measurements, processing and storing information and for communicating with the earth's surface. Preferably, the bottom hole assembly is located within several drill collar lengths of the drill bit 16. In the illustrated bottom hole arrangement of FIG. 1, a stabilizer collar section 38 is shown immediately above the drill bit 16, followed in the upward direction by a drill collar section 40, another stabilizer collar section 42 and another drill collar section 44. This arrangement of drill collars and stabilizer collars is illustrative only, and other arrangements may of course be used. The need for or desirability of the stabilizer collars will depend on drilling conditions In the embodiment shown in FIG. 1, the components of the downhole measurement subassembly are preferably located in the drill collar section 40 above the stabilizer collar 38. Such components could, if desired, be located closer to or farther from the drill bit 16, such as, for example, in either stabilizer collar section 38 or 42 or the drill collar section 44.

The bottom hole assembly 36 also includes a telemetry subassembly (not shown) for data and control communication with the earth's surface.

The bottom hole assembly 36 preferably also includes conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. Alternatively, the data may be stored downhole and retrieved at the surface upon removal of the drill string. Suitable downhole circuitry for these purposes is described in U.S. Pat. No. 4,972,082 and U.S. Pat. No. 5,051,581. To facilitate electrical connections and signal transmission between the measurement subassembly, the data acquisition and processing subassembly, and the data telemetry subassembly, these components are preferably located adjacent to each other in the drill string. Where this is not feasible, the data communications system of the aforementioned U.S. Pat. No. 5,235,285, which provides for both local downhole communication over short distances and downhole-to-surface communication, may be utilized. Power for the downhole electronics may be provided by battery or by a downhole turbine generator powered by the drilling fluid.

A preferred embodiment of the downhole measurement subassembly is shown in FIGS. 2–4, where the drill collar section 40 is shown as surrounding a stainless steel tool chassis 54. The drill collar may be of any suitable size, e.g. having an 8"OD with a 5"ID). Formed in the chassis 54 to one side of the longitudinal axis thereof, as best seen in FIGS. 3 and 4, is a longitudinally extending mud channel 56 for conveying the drilling fluid downward through the drill string. Eccentered to the other side of the chassis 54 are a neutron accelerator 58, its associated control and high voltage electronics package 60 and a coaxially aligned, near-spaced detector 62. The accelerator is preferably a D-T type (14 MeV) source as is known in the art.

The near-spaced detector 62 should be primarily responsive to accelerator output with minimum formation influence. To that end, the detector 62 may comprise an epithermal neutron detector, e.g., a $^3$He proportional counter, which is located close to the accelerator without intervening high density shielding. The sensitive volume of the detector 62 is clad in cadmium or other high thermal neutron capture cross section material (not shown) to raise the detection threshold to epithermal levels. The detector 62 is also surrounded, preferably on all surfaces except that adjacent to the accelerator 58, by a shield 64 of combined neutron moderating-neutron absorbing material, such as boron carbide (or other 1/v type absorber) distributed in an epoxy (or other hydrogenous material) binder ("B4CE"). More detailed information concerning the structure and function of the shielding for such a near-spaced $^3$He detector is set out in U.S Pat No. 4,760,252 (incorporated herein by reference).

Alternatively, the near detector 62 may be a higher energy (MeV) detector, such as a $^4$He detector, surrounded by tungsten, heavimet or other high-z shielding to both shield the detector from the formation and multiply the number of non-formation neutrons incident upon the detector. The multiplying effect is due to the large (n, 2n) and (n, 3n) cross section of the high-Z material, which converts 14 MeV source neutrons into two or three neutrons below approximately 6 MeV, where the $^4$He scattering cross section is large. Thus, the high-z shielding not only decreases the sensitivity of the near-detector signal to formation scattered neutrons, it also effectively attenuates the source (14 MeV) neutron flux along the tool.

If, as described below, the farther-spaced neutron detectors are shielded in a B4CE (or like moderating-absorbing) material, the slowing down power of the hydrogen in the B4CE can be used to further reduce the energy of the neutrons while the absorbing power of the boron serves to attenuate the low energy neutron flux. The ordering of the shielding materials, high-Z material near the neutron source and the B4CE (or like) material following, is critical, as the reverse order is ineffective to shield high energy neutrons. Whether the near-spaced detector 62 is an eV detector or an MeV detector, the combined effect of the detection energy, placement and shielding of the near detector should be such as to render the detector output relatively insensitive to formation porosity and primarily proportional to the neutron flux from the accelerator. The output of the near detector 62 may then be used to normalize other detector outputs for source strength fluctuation.

Located longitudinally adjacent to the near-spaced detector 62 is a plurality or array of detectors 66a, 66b, 66c and 66d. The array includes at least one, and preferably more than one, epithermal neutron detector and at least one gamma ray detector one or more thermal neutron detectors may optionally be included. As illustratively depicted in FIG. 4, there are two epithermal detectors 66a and 66b, one thermal neutron detector 66c and one gamma ray detector 66d. A different number or mix of detectors may be provided if desired. The principal purpose of the epithermal neutron detectors 66a, 66b is to measure the epithermal neutron flux in the formation at a spacing sufficiently close to the neutron source to minimize, or at least significantly reduce, the effect on the detector outputs of the heavier formation elements, such as oxygen, silicon, carbon, calcium, etc., which dominate bulk density, and to maximize, or at least significantly enhance, the influence of formation hydrogen on the detector outputs. So positioned, the epithermal neutron detector response will depend primarily on the hydrogen index with only a residual lithology effect. To enhance sensitivity to the formation, the epithermal detectors 66a, 66b, which may be $^3$He proportional counters, are preferably located closely adjacent the drill collar wall and backshielded, as shown at 68a and 68b, to reduce borehole neutron sensitivity. The shielding material is preferably the same as that described previously in connection with the near detector 62, i.e. cadmium cladding and B4CE. As described more fully below, neutrontransparent windows 70a and 70b are preferably formed in the drill collar to further enhance detector sensitivity and to provide a greater depth of investigation.

As illustrated in FIG. 4, the epithermal neutron detectors 66a, 66b and the associated windows 70a, 70b are preferably spaced apart circumferentially of the drill collar 40 for enhanced angular or azimuthal resolution. Any desired circumferential spacing of the detectors may be used. Although the detectors 66a, 66b are shown at the same longitudinal spacing from the accelerator 58, one or more additional detectors could be provided at different longitudinal spacings for enhanced vertical resolution. Circumferentially and horizontally spaced detector arrays, as well as further details concerning the configuration of the individual detectors and their shielding, are described in more detail in U.S. Pat. No. 4,760,252 and No. 4,972,082. The high spatial resolution of the slowing down time measurement, as described in the '082 patent, makes the azimuthal measurement of slowing down time in accordance with the present invention of particular interest and value. It is to be noted that the source/detector spacings described in U.S. Pat. No. 4,760, 252 and U.S. Pat. No. 4,972,082 are for wireline tools. Somewhat longer spacings should be provided in a measurement-while-drilling tool to account for the fact that the detectors are looking at the formation through the drill collar.

The thermal neutron detector 66c may likewise be a $^3$He proportional counter shielded, as at 68c, similarly to the epithermal detectors 66a, 66b, except that the cadmium cladding is omitted on the formation side to render the detector sensitive to formation thermal neutrons. A neutron transparent window 70c may be provided in the drill collar 44 adjacent to the thermal detector 66c. Additional thermal neutron detectors may be provided as needed to obtain the desired horizontal and/or vertical resolution. The output signals from the thermal neutron detector(s) 66c may be processed as described in the incorporated portions of U.S. Pat. No. 4,760,252 to derive a thermal neutron porosity measurement and/or in accordance with the disclosure of U.S. Pat. No. 5,235,185, to derive measurements of formation sigma and standoff.

The gamma ray detector 66d may comprise any suitable type detector, such as NaI, BGO, CsI, anthracene, etc., but preferably is a cerium-activated gadolinium orthosilicate (GSO) detector as disclosed in U.S. Pat. No. 4,647,781 and U.S. Pat. No. 4,883,956. As disclosed in those patents, the GSO detector is preferably surrounded by boron to reduce the influence of thermal and epithermal neutrons on the detector response. Also, a tungsten or other high density shield (not shown) may be placed between the accelerator 58 and the GSO detector 66d to reduce the flux of high energy neutrons incident on the detector.

Although not shown, it will be understood that appropriate timing and control circuitry will be provided to operate the accelerator 58 in a pulsed mode and to gate the detector 66d as needed selectively to detect inelastic and/or capture gamma rays. The energy detection range is preferably broad, e.g. from 0.1 to 11 MeV. A principal purpose of the detector 66d is to provide inelastic and/or capture gamma ray energy spectra and energy window count rates. In particular, the energy spectra can be spectrally analyzed to derive information concerning the elemental composition of the formations under investigation.

The preferred technique for analyzing the spectral data from the gamma ray detector 66d to obtain the elemental spectroscopy and lithology information is described in U.S. Pat. No. 5,440,118. Briefly, inelastic scattering gamma ray spectra are analyzed by a least squares spectral fitting process to determine the relative elemental contributions thereto of chemical elements postulated to be present in an unknown earth formation and contributing to the measured spectra from the formation. The relative inelastic yields for silicon, calcium and magnesium are calibrated to provide straightforward estimates of the respective elemental concentrations for those elements and of the volumetric fractions of the elements or associated rock types, such as sandstone, limestone and dolomite, in the formation. The ratio of the relative inelastic yields for magnesium and calcium provides an indication of the degree of dolomitization of a formation. Based on the calibrated inelastic yields for silicon and/or calcium, calibrated estimates of the elemental yields from measured thermal neutron capture gamma ray spectra may also be determined, from which further information concerning formation lithology may be derived.

Measurements of the epithermal neutron slowing down time and tool standoff from the borehole wall may be derived from the outputs of the epithermal neutron detectors 66a, 66b. Because the large amount of steel present in the drill collar 40 and chassis 54 acts as a long lifetime storage sink for neutrons, the sensitivity of the detectors 66a, 66b to epithermal neutron slowing down time is substantially reduced. To measure epithermal neutron slowing down time while drilling, therefore, it is important to properly locate the detectors 66a, 66b relative to the drill collar 40, to provide properly constructed neutron windows 70a, 70b and to properly back-shield the detectors 66a, 66b. As shown in FIG. 4 and as noted above, the sensitive volumes of the detectors 66a, 66b are preferably mounted in the tool chassis 54 closely adjacent the inner wall of the drill collar 40 and immediately opposite the respective neutron windows 70a, 70b in the drill collar. Each detector is also preferably back-shielded (with B4CE or the like) on both ends and on all sides except the side facing the drill collar. The windows 70a, 70b are preferably made of titanium or other high-strength, low-scattering cross section material which is sheathed in boron. To further reduce neutron entry into the drill collar 40, a boron carbide layer 72 with holes to match the locations of the windows 70a, 70b is preferably provided on the exterior of the drill collar 40 in the region of the detectors. Modeling and experimental data have shown that the sensitivity of the epithermal neutron slowing down time curves to porosity from detectors positioned, shielded and windowed in this way is greater than for detectors without windows or external boron shielding.

Figure 5:
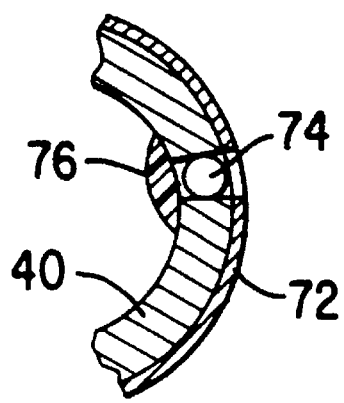
FIG. 5 is a partial horizontal cross-sectional view, showing another configuration of an array epithermal neutron detector and its associated neutron window.

As alternatively shown in FIG. 5, it is possible to enhance detector sensitivity still further by placing the detectors 74 in the drill collar 40 itself, with boron carbide back-shielding 76 and an external boron carbide layer 72 with matching holes as in FIG. 4. This combination, though feasible, exposes the detectors to greater risk of damage during drilling and also requires machining of the drill collar to form the detector receptacles.

Figure 6:
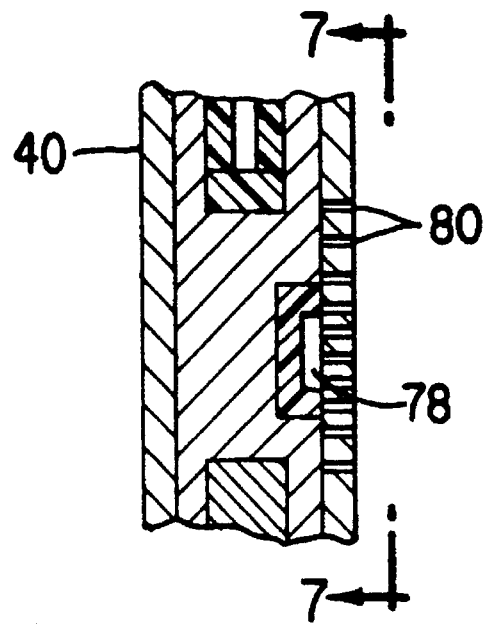
FIG. 6 is a partial vertical cross-sectional view of another embodiment of the downhole measurement subassembly, showing an alternative embodiment of a neutron window.
Figure 7:
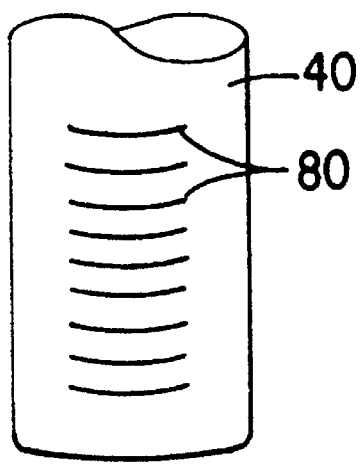
FIG. 7 is an external view taken along the line 7—7 in FIG. 6, showing the external configuration of the neutron window of FIG. 6.
Figure 8:
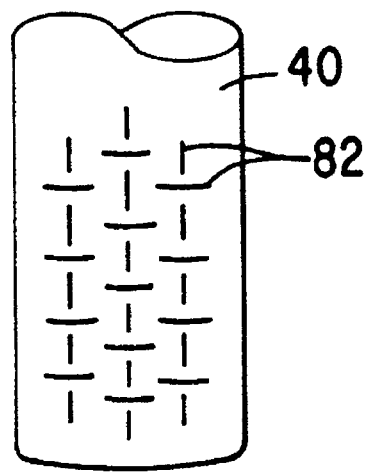
FIG. 8 is an external view similar to FIG. 7, showing the external configuration of another embodiment of a neutron window.

As an alternative to the use of boron-sheathed neutron transparent windows 70a, 70b, as shown in FIG. 4, the slowing down time and count rate sensitivity of the epithermal neutron detectors 66a, 66b can be enhanced by providing transverse layers of boron or other high-absorption cross section material in the drill collar 40 in the region of the epithermal neutron detectors. This is illustrated in FIGS. 6–8. FIG. 6 depicts an epithermal neutron detector 78 eccentered against the drill collar wall and back-shielded as in FIG. 4. A plurality of transverse boron carbide layers 80 are embedded in the collar wall, where they act as a "Venetian blind" to permit neutron travel transversely across the collar to the detector while blocking neutron flow along the collar. FIG. 7 illustrates the external pattern of boron carbide layers 80 of FIG. 6. An alternative pattern of boron carbide layers 82 is shown in FIG. 8. This pattern serves to minimize neutron flow through the collar in both longitudinal and circumferential directions without interfering with transverse flow. The boron carbide layers 80 and 82, therefore, function essentially as a neutron window for the epithermal or thermal neutron detectors.

The use of neutron absorbing layers as shown in FIGS. 6–8 has been found to be particularly important for reducing neutron flow in low scattering cross section material, such as titanium, which is desirable as a drill collar material in measurement-while-drilling application because of its relative transparency to neutrons but which, because of its lower density, does not attenuate the component of neutron transport parallel to or circumferentially of the drill collar to the same extent as does steel. For further effectiveness, the boron carbide layers could also be included in the tool chassis 54 on the accelerator side, or on both sides, of the neutron detectors.

With reference again to the overall measurement subassembly configuration shown in FIG. 2, a far-spaced detector 84 is located downstream of the array detectors 66a–66d with an intervening neutron shield 86. The detector 84 and shield 86 are preferably coaxial with the accelerator 58. In accordance with the invention, the far-spaced detector 84 is selectively positioned relative to the neutron source so as to be sensitive to MeV energy neutrons (or, preferably, MeV neutron-induced gamma rays) that penetrate to relatively far distances in the formation. As the transport of MeV energy neutrons has reduced sensitivity to formation hydrogen content and enhanced sensitivity to the density of heavier formation elements, as compared to KeV-eV energy neutrons, the response of the detector 84 will be strongly influenced by formation bulk density and, because of the close relation between density and matrix type, formation lithology.

Preferably, the detector 84 comprises a GSO gamma ray detector as described in the aforementioned U.S. Pat. No. 4,647,782 and No. 4,883,956, although any suitable type, such as anthracene, NaI, BGO, CsI, etc., may be used so long as acceptable count rate statistics and energy resolution are achieved. The preferred energy detection range is from 0.1 MeV to 11 MeV. Alternatively, a neutron detector sensitive to MeV range neutrons, e.g.>0.5 MeV., may be used. The preferred neutron detectors are a $^4$He type or a liquid scintillatot type.

Where a gamma ray detector is employed as the far-spaced detector 84, the intervening shield 86 is preferably B4CE or like neutron moderating-absorbing material. If an MeV neutron detector is used, the shield 86 is preferably a high-Z material such as tungsten, except where the near-spaced detector 62 is also a $^4$He (or other MeV detector) shielded by high-Z material. In the latter case, the shielding 86 should also be B4CE or the like to take full advantage of the aforementioned neutron moderating effect of the high-Z shielding material 64 surrounding the near-spaced detector 62.

Although the far-spaced detector 84 may be either a gamma ray detector or an MeV neutron detector, a gamma ray detector is preferred because gamma rays have better sensitivity to gas than do neutrons in some situations, thereby facilitating the identification of gas-bearing formations. Also, as described above in connection with the array gamma ray detector 66d, the use of a gamma ray detector permits a spectral analysis to be made to obtain information of the elemental composition and lithology of the formation. Such a spectral analysis may be made at both, or only one, of the array detector 66d and the far-spaced detector 84. The output of either (or both) gamma ray detector could additionally be employed to derive measurements of the formation macroscopic capture cross section for thermal neutrons (ρ) or its correlative the thermal neutron decay time constant (τ). Any of the known techniques for deriving Σ or τ may be used for this purpose. Also, where the far-spaced detector 84 is a gamma ray detector, the array gamma ray detector could be omitted if space or other considerations dictate.

A second far-spaced detector (not shown) may be provided if desired. If so, it preferably is located coaxially with and closely adjacent to the detector 84. If the detector 84 is a gamma ray detector, the second far-spaced detector is preferably a neutron detector and vice versa. Although not specifically shown, it will be understood that the above-described detectors include all amplification, pulse shaping, power supply and other circuitry required to generate output signals representative of the radiation detected. All such circuitry is well known in the art.

The signals from the several detectors provided in this tool may be processed in various ways to obtain the desired petrophysical information. Further details of the processing are to be found in the parent application no. 08/307,894 (incorporated herein by reference).

Figure 9:
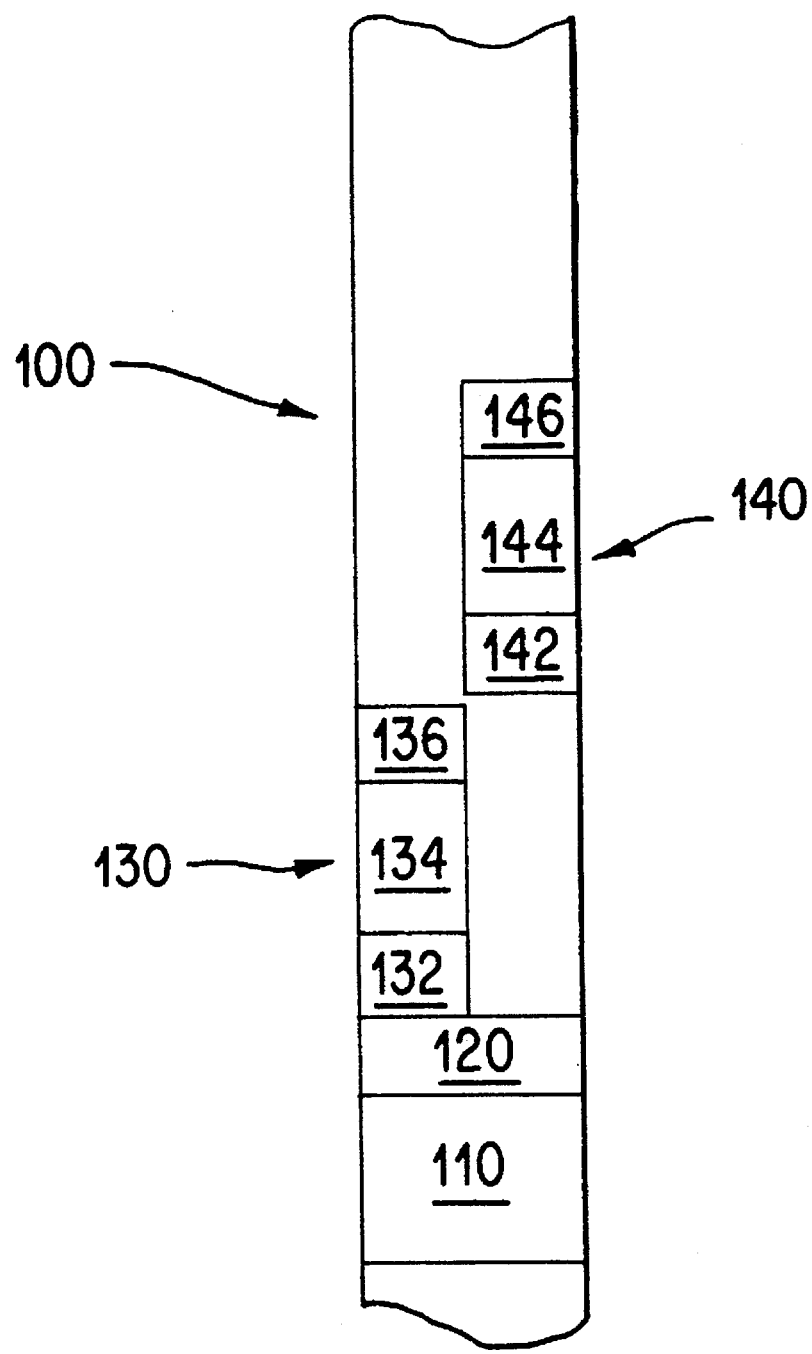
FIG. 9 is a schematic view of a wireline logging tool according to one embodiment of the invention.

FIG. 9 shows a schematic diagram of a wireline logging tool embodiment of the invention. This tool, available as the RST-B tool from Schlumberger, comprises a tool body 100 which can be lowered and logged through a well in the usual manner. The wireline cable, telemetry electronics and surface equipment are omitted for clarity. Inside the tool body 100 is a 14 MeV D-T accelerator neutron source 110 which is substantially as described above. Separated from this by a shielding region 120 are near and far detectors 130, 140. Each detector 130, 140 comprises a scintillator crystal 132, 142 such as GSO (or BGO or LSO if appropriate), an associated photomultiplier robe 134, 144 and electronics package 136, 146 which outputs signals which are transmitted to the surface for analysis.

The conversion of the measurements made by the gamma ray detector can be analyzed according to the following scheme, in which the response of a detector to the flux of gamma rays coming from the secondary source can be written as:

$$N_{ox} = C\, N_s e^{-aXn} p_{ox} e^{-bXc-cXpp} \quad (1)$$

where: C=calibration constant, $N_s$=neutron source strength, $e^{-aXn}$=fast neutron attenuation, $p_{ox}$=formation oxygen concentration, and $e^{-bXc-cXpp}$=gamma-ray attenuation.

Eqn.(1) assumes a fixed detector location and does not include solid angle effects. These are accounted for by including them in the calibration constant C. The neutron source strength $N_s$ is the output level of the neutron source (minitron) in neutrons/second.

The fast neutron attenuation depends on the fast neutron cross section Xn which is determined by the composition of the surrounding borehole/formation environment. The fast neutron cross section is the sum of all the various reactions influencing fast neutron transport including elastic scattering, inelastic scattering, and charged particle production. Of these, elastic scattering from hydrogen is the most important. Hence, fast neutron transport should be strongly dependent on the slowing down length of the borehole/formation environment in a manner very similar to a thermal neutron porosity measurement but with much less dynamic range. For this reason, any detected signal that exhibits this type of dependence can be used as a correction signal for this density measurement. The correction signal can be that of a fast neutron detector, a thermal neutron detector, FS or from the inelastic measurement itself such as the inelastic iron or crystal background signal.

Figure 10:
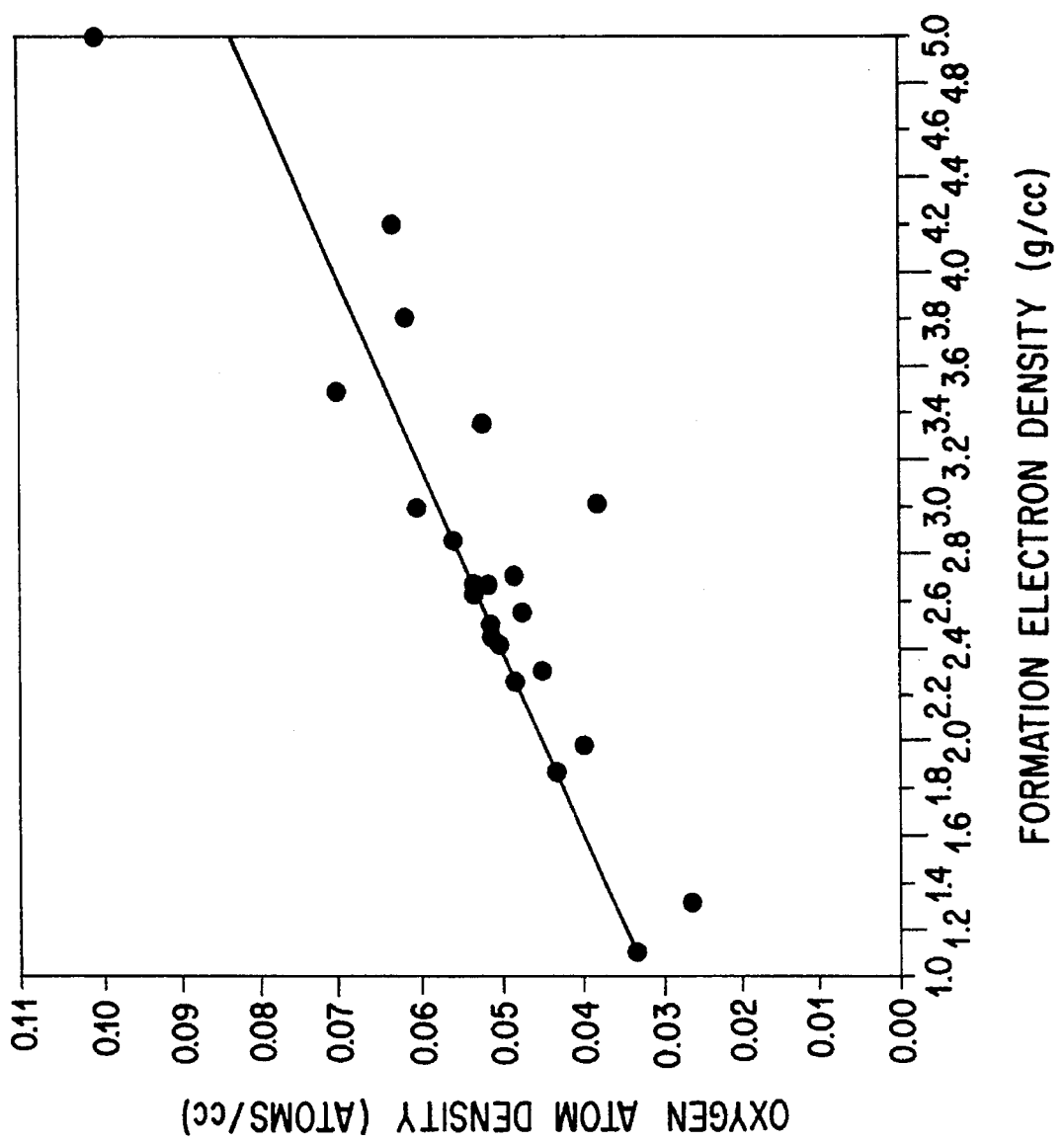
FIG. 10 is a plot of oxygen atom density vs. formation electron density for a number of formations.

Since it is proposed that this density measurement utilize high-energy gamma rays from oxygen as a secondary source, the intensity of the detected gamma rays will be dependent on the atomic concentration of oxygen in the borehole and formation. In general, the oxygen concentration is unknown, but it can be shown (see FIG. 10) that for most fluid bearing sedimentary rocks (sandstones, limestones, dolomites, chlorites, anhydrites, biotites, siderites and garnets are plotted), the oxygen concentration can be related to the rock density by a simple linear relationship:

$$p_{ox} = d + e\, p_e \quad (2)$$

where d and e are constants and $p_e$ is the electron density index of the rock.

The gamma-ray attenuation term describes the dependence of the inelastic oxygen count rate on Compton scattering and pair production absorption. The count rate depends exponentially on both the Compton (Xc) and pair production (Xpp) cross sections. The pair production cross section depends on the square of the average atomic number Z of the formation. The average formation Z can be inferred from the inelastic gamma-ray spectrum by using the ratio of low to high energy windows to measure formation Pe in a manner identical to that of the standard density/lithology measurement. Thus, a Pe measurement can be made that will provide an estimate of the correction needed for the pair production absorption effects of eqn.(1)

Rearranging terms, eqn.(1) can be written $$N_{ox} = K\, p_{ox} e^{-bXc} \quad (3)$$

where $$K = C\, N_s e^{-aXn} e^{-cXpp} \quad (4)$$

now contains the normalization constant, neutron source strength, neutron transport term, and pair production absorption term. The slope in eqn.(2) is much less than one, so to good approximation $$p_{ox} = f e^{g p_e} \quad (5)$$

Substituting eqn.(5) into eqn.(3), $$N_{ox} = K\, e^{-bxc} f e^{g p_e}$$

The Compton cross section Xc is proportional to the electron density index $p_e$ of the formation $$Xc = h\, p_e$$

and new normalizing constants can be defined $$K_s = K f$$

and $$i = bh$$

so that, $$N_{ox} = K_s e^{-(i-g)p_e} \quad (6).$$

From eqn.(6) it is seen that the oxygen concentration term has been absorbed into the density dependence of eqn.(1), serving merely to decrease the sensitivity of the inelastic gamma-ray density measurement.

Defining a new sensitivity constant $$k=i-g$$

we obtain $$N_{ox}=K_s e^{-kp_e} \qquad (7)$$

or $$N_{ox}/K_s = e^{-kp_e} \qquad (8)$$

which is identical to the response equation for a chemical source density measurement. It is important to note from eqn.(8) that it is the corrected oxygen count rate $N_{ox}/K_s$ that displays exponential attenuation versus electron density, not simply $N_{ox}$. Using eqn.(4) to expand the left side of eqn.(8), we have $$N_{ox}/K_s = N_{ox}/(C\, N_s e^{-aXn} e^{-cXpp}) \qquad (9)$$

where the oxygen count rate is corrected for pair production, neutron transport, neutron source strength, and the normalization constant. In general, the neutron source strength is not constant and must be monitored and corrected for.

Monte Carlo simulations can be performed to check the validity of eqn.(7). A model of a minitron-based 6.5" LWD tool in an 8.5" fresh water borehole is used to compute the intensity of inelastic gamma rays from the tool, borehole, and formation. The gamma-ray spectrum from each element is computed for each case studied as well as the fast neutron spectrum. The fast neutron signal and the known average Z of the formation are used to compute $K_s$ for each case. The logarithm of $N_{ox}/K_s$ is plotted in FIG.(2) versus electron density $p_e$ for each formation.

Figure 11:
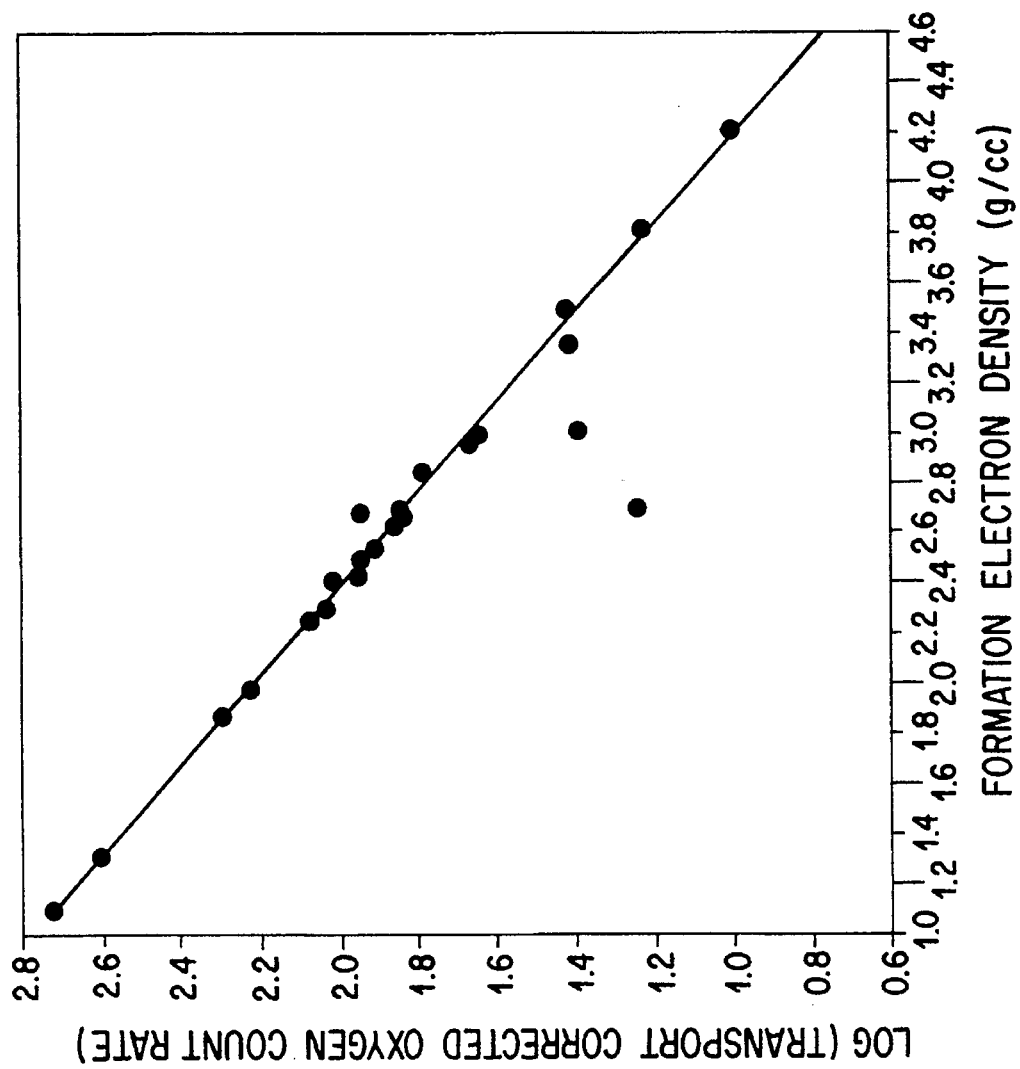
FIG. 11 is a plot of oxygen count rate vs. formation electron density for the formation plotted in FIG. 10.

Calculations for water and gas-filled sandstone, limestone, dolomite and clays and evaporites can be seen in FIG. 11. From the figure it is clear that the inelastic gamma-ray density measurement can be a valid substitute for the chemical source based density measurement. The only data points not falling on the response curve are those belonging to evaporites that do not fall on the curve of FIG. 10 relating oxygen concentration to formation electron density. In these cases, the oxygen concentration is low compared to the fluidfilled sedimentary rocks, even though the density is high. This results in a low inelastic oxygen count rate and an artificially high density reading. In practice, these cases can be identified by using spectral analysis to resolve the inelastic spectrum into its elemental components and then using this information to flag the log for evaporites or other formation types that do not satisfy eqn.(2).

The widespread use of water-based drilling fluids necessitates the correction of inelastic gamma-ray density values for the effects of changing borehole environment, since waterbased drilling fluids contain significant oxygen concentrations. Borehole compensation can be performed in a manner similar to that used in the chemical source density measurement. That is, inclusion of a second detector closer to the neutron source will provide the means to measure tool standoff, rugosity, and borehole washout effects. Correction of the density log can be accomplished using any scheme that takes advantage of the differences in radial sensitivities of the two detectors. To make an accurate correction, mud composition information, which is generally available, may be required.

I claim:

1. A method of determining the density of underground formations surrounding a borehole, comprising:
   a) irradiating the formations with high energy neutrons from within the borehole;
   b) detecting gamma rays in the borehole resulting from the irradiation with high energy neutrons; and
   c) analyzing the detected gamma rays to determine the density of the formations.

2. A method as claimed in claim 1, wherein the step of irradiating the formation comprises irradiating with a pulsed neutron source.

3. A method as claimed in claim 1, wherein the step of detecting gamma rays comprises detecting gamma rays resulting from the inelastic scattering of high energy neutrons by oxygen atoms in the formations.

4. A method as claimed in claim 3, comprising making a spectral measurement of gamma rays and identifying the gamma rays resulting from the inelastic scattering of high energy neutrons by oxygen atoms in the formations.

5. A method as claimed in claim 4, wherein the spectral measurement is used to identify lithologies of the formations which are used to correct the determination of densities.

6. A method as claimed in claim 4, further comprising measuring neutron output from the source and analyzing the detected gamma rays using the measured neutron output.

7. A method as claimed in claim 1, further comprising determining attenuation of high energy neutrons in the borehole and formations and analyzing the detected gamma rays using the determined attenuation.

8. A method as claimed in claim 1, wherein the step of analyzing the detected gamma ray comprises determining oxygen concentrations in the formations and determining the densities from the oxygen concentrations.

9. A method as claimed in claim 8, further comprising determining electron density indices for the formations and using the indices in the determination of densities.

10. A method of determining the density of underground formations surrounding a borehole, comprising:
   a) creating a source of gamma rays in the formations by irradiating the formations from within the borehole;
   b) detecting gamma rays from the source in the borehole; and
   c) analyzing the detected gamma rays to determine the density of the formations.

11. A method as claimed in claim 10, wherein the source is created by irradiating the formations with high energy neutrons.

12. A method as claimed in claim 10, comprising creating a source in the formations whose position within the formations is substantially constant, irrespective of formation properties.

13. A method as claimed in claim 12, wherein the source is created by inelastic scattering of high energy neutrons by oxygen atoms in the formation.

14. Apparatus for determining the density of underground formations surrounding a borehole, comprising:
   a) a tool body;
   b) a high energy neutron source in the tool body for irradiating the formations from within the borehole;
   c) a detector which detects gamma rays in the borehole resulting from the irradiation of the formations with high energy neutrons; and
   d) means for analyzing the detected gamma rays to determine the density of the formations.

15. Apparatus as claimed in claim 14, wherein the high energy neutron source comprises a 14 MeV D-T accelerator source.

16. Apparatus as claimed in claim 14, further comprising a source monitor for determining the neutron output of the source.

17. Apparatus as claimed in claim 14, wherein the detector comprises a spectral gamma ray detector.

18. Apparatus as claimed in claim 17, wherein the means for analyzing the detected gamma rays analyzes the output from the detector to measure gamma rays arising from the inelastic scattering of neutrons by oxygen atoms in the formation.

19. Apparatus as claimed in claim 14, wherein the tool body comprises a wireline logging tool.

20. Apparatus as claimed in claim 14, wherein the tool body comprises a logging-while-drilling tool.

* * * * *